United States Patent [19]

Bosserman

[11] 4,361,384
[45] Nov. 30, 1982

[54] HIGH LUMINANCE MINIATURE DISPLAY

[75] Inventor: David A. Bosserman, Alexandria, Va.

[73] Assignee: The United States of America as represented by the Secretary of the Army, Washington, D.C.

[21] Appl. No.: 163,542

[22] Filed: Jun. 27, 1980

[51] Int. Cl.³ .......................... G02B 27/14; G02B 7/18
[52] U.S. Cl. ....................................... 350/174; 350/298
[58] Field of Search ............................. 250/330–333; 340/794, 795, 797, 380, 810, 781; 313/103 CM, 105 CM; 350/298, 301, 174

[56] References Cited

U.S. PATENT DOCUMENTS

| | | | |
|---|---|---|---|
| 2,951,970 | 9/1960 | Matarese | 340/781 |
| 3,059,519 | 10/1963 | Stanton | 350/298 |
| 3,205,303 | 9/1965 | Bradley | 350/298 |
| 3,923,370 | 12/1975 | Mostrom | 350/298 |
| 3,971,931 | 7/1976 | Jehle | 250/331 |

*Primary Examiner*—Bruce Y. Arnold
*Attorney, Agent, or Firm*—Nathan Edelberg; Milton W. Lee; John E. Holford

[57] ABSTRACT

A miniature, helmet mounted, display panel having a very wide range of luminance is provided by combining a thin film flat panel display with a wafer diode image intensifier tube.

3 Claims, 4 Drawing Figures

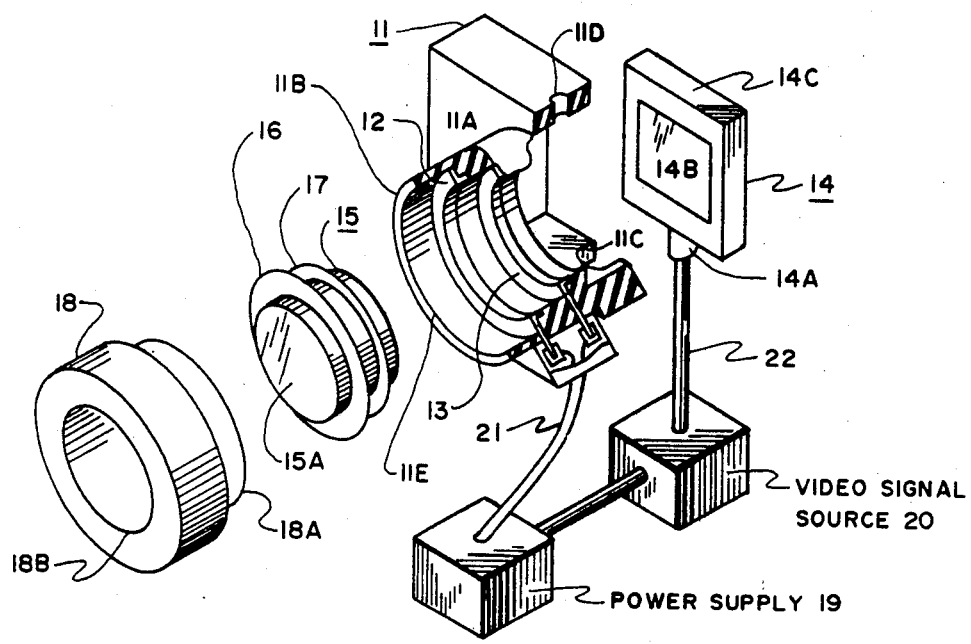
FIG. 1
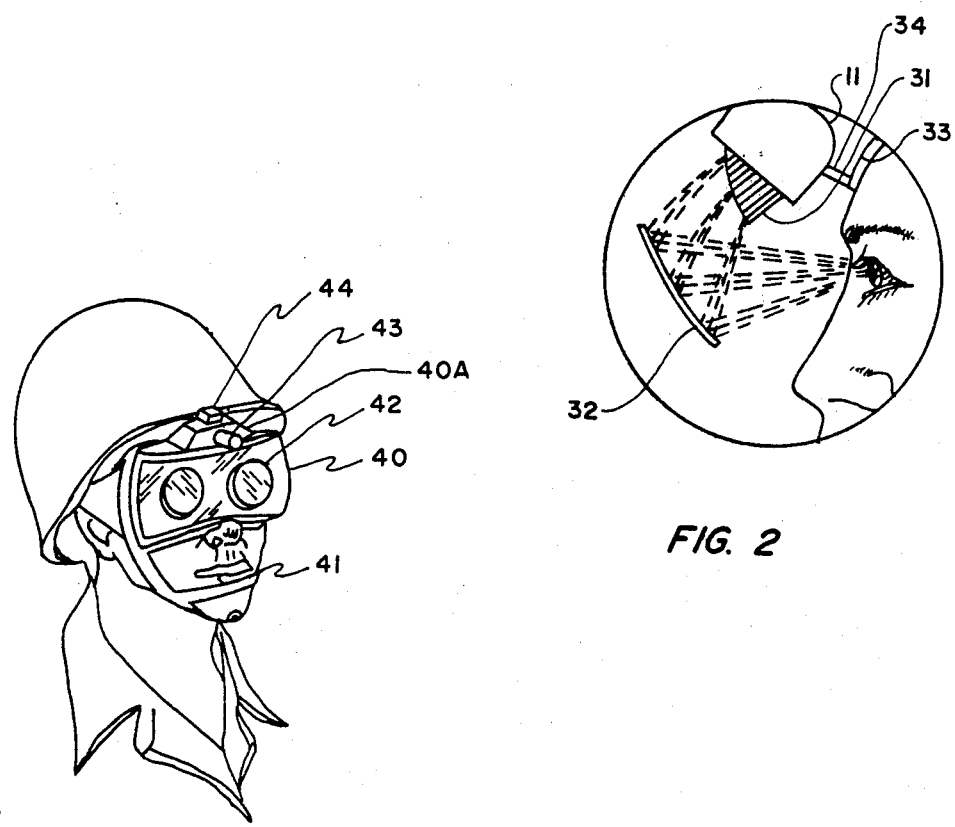
FIG. 2
FIG. 3

HIGH LUMINANCE MINIATURE DISPLAY

The invention described herein may be manufactured, used, and licensed by the U.S. Government for governmental purposes without the payment of any royalties thereon.

BACKGROUND OF THE INVENTION

1. Field of the Invention

The invention applies to the class of devices which convert the information contained in frequency modulated, phase modulated or amplitude modulated electromagnetic signals and the like generated by a variety of detectors into a visible image.

2. Description of the Prior Art

The classic device for performing the function outlined above is a cathode ray tube. This device produces light fairly economically with respect to power input and operates to high levels of luminance and resolution. The tube itself, however, is bulky and heavy making it difficult to accommodate in small systems such as head mounted displays or in limited spaces like aircraft cockpits. There are also problems in data systems with the various types of distortion to which focussed electron beams are susceptible.

Most of the above problems are allieviated by using a solid state flat panel display. The picture elements (pixels) that provide final resolution of the image are defined by electrodes or by the size and shape of each light emitting element. These displays can also be composed of externally illuminated reflecting elements as found in liquid crystal arrangements. This requirement, however, sometimes conflicts with military needs for a low level of ambient luminance to prevent detection by the enemy. Thin film electroluminescent devices work very well in these displays but have a very limited brightness, e.g. 350–500 NITS, which makes them difficult to read against high ambient light levels. Light emitting diodes are better in this respect, but are inefficient and difficult to fabricate in useful sizes and shapes for this purpose, which results in higher costs and compromises in the resolution of the display.

SUMMARY OF THE INVENTION

The object of the present invention is to provide a hybrid display device which combines a solid state flat panel display with an image intensifier tube to provide a high luminance display that solves the problems previously mentioned and provides additional advantages as well.

BRIEF DESCRIPTION OF THE DRAWINGS

The invention is best understood with reference to the attached drawings wherein:

FIG. 1 shows a typical display unit according to the present invention;

FIG. 2 shows a display unit in a head mounted configuration;

FIG. 3 shows a multi-mode viewer in which the display unit can be employed; and

DESCRIPTION OF THE PREFERRED EMBODIMENT

Figure 4:
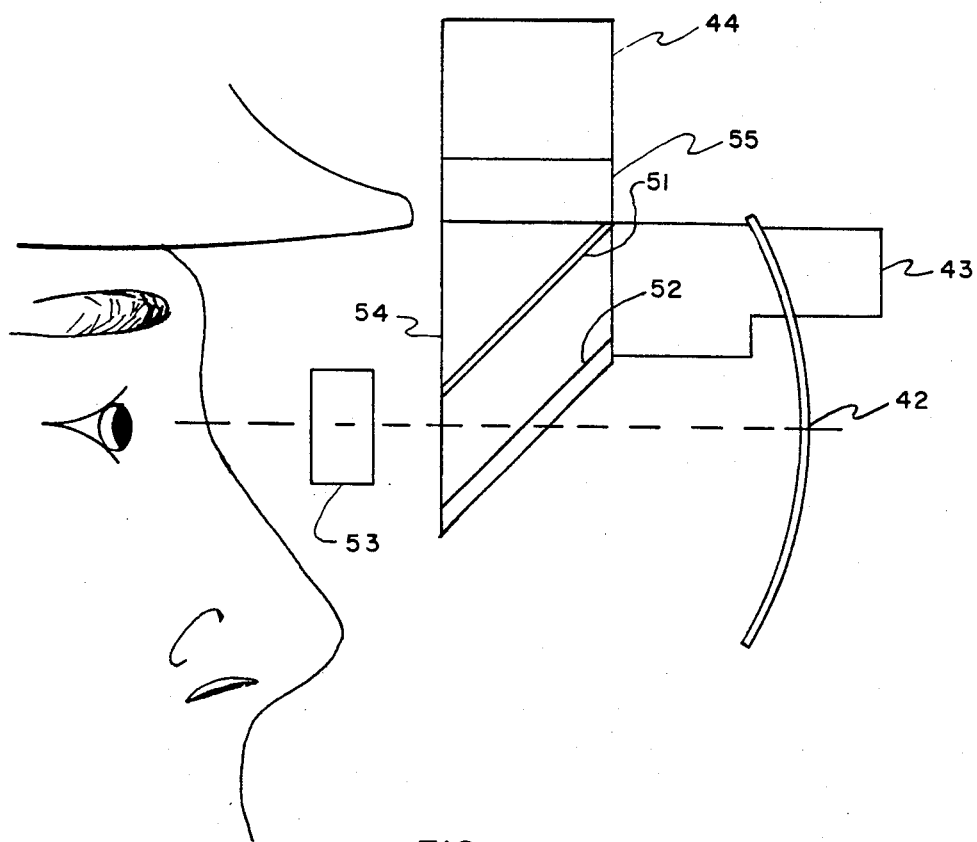
FIG. 4 shows a diagrammatic view of the FIG. 3 device.

Referring again to FIG. 1 there is shown the basic display unit according to the present invention. The unit is contained in a simple housing member 11, as shown, or this member can be a part of a larger housing containing other elements which cooperate with the display, either to process the light image produced thereby or to combine and/or substitute its image with respect to other display devices. The housing is composed of two adjacent sections 11A and 11B. Each section has a central passageway extending completely therethrough. The cross-section of each passageway is symmetrical about an axis normal to the cross-section and the axes of symmetry in both passageways are co-linear. The cross-section of section 11A is preferably rectangular to accept a specific solid state flat screen device currently available, but it may be that special purpose screens of round or other shapes will later become available and that these would be preferred for certain applications. Section 11A also has a notch 11C to accommodate a stem on the above available device which may not be necessary for the devices, e.g. if the stem is later placed on the side opposite the screen. One or more apertures 11D are drilled through the housing and tapped to receive a thumb setscrew, e.g. plastic tipped, which engage the solid state device. Instead of a setscrew a spring loaded detent may be used to further facilitate insertion or removal of the solid state device.

The cross-section of the passageway in section 11B is circular to match that of the currently available wafer tubes used in image intensifiers. In this regard, the same passageway is also stepped twice axially and the steps are provided with ring contacts 12 and 13, blade portions of which are molded through the housing to permit external excitation. The material of the housing must, therefore, be a plastic material which has good electrical insulating properties as well as being easily molded.

The solid state flat screen imager 14 is preferably the type described in the Rockwell International report on Contract No. DAAK70-78-C-0123 dated December 1979 and prepared for the U.S. Army Night Vision and Electro-Optics Laboratory at Fort Belvoir, VA. The rectangular dimensions of the imager are 15×45×55 mm (i.e. without the coaxial stem connected 14A which is approximately). A 32×32 line-pixel unit has been made and the feasibility of a 512×683 line-pixel unit has been demonstrated for the volume given above. The unit contains a display panel 14B and four integrated circuit boards linked by a flexible substrate and folded into a five layer sandwich. The latter is hermically sealed in a metal housing 14C with the display panel forming most of one 45×55 mm exterior wall.

A wafer tube type of image intensifier tube 15 is inserted into the round passageway in section 11B of the housing so that its ring electrodes 16 and 17 engage contacts 12 and 13. The axial length of the steps in the passageway in section 11A are proportioned to the electrode spacing of the tube and its overall length so that the phosphor screen of the tube is substantially flush with the large diameter end of the passageway and its photocathode is substantially flush with the smaller diameter end and substantially in contact with the display panel 14B. The tube is held in housing 11 by means of a retaining ring 18 having a maximum diameter equal to the outer diameter of section 11B and a stepped down portion 18A to fit into the large diameter end of the round passageway of the former. The round passageway and the stepped down portion are either slightly tapered in diameter to provide a force fit or provided with mating threads. The inner diameter of retaining ring 18 is only slightly larger than the outer diameter of the tube (ignoring electrodes 16 and 17) and may, therefore, also act as a shade for screen 15A. To provide a greater angle of view the inner diameter of the ring may taper linearly from the screen diameter at the screen to the maximum ring diameter farthest from the tube.

The wafer tube 15 has evolved out of a number of technologies. The first intensifier tubes of this type had a photocathode, a phosphor screen anode and an electric field focussing system which amplified and inverted the image. Later microchannel plates using current amplification by secondary emission provided better performance and image inversion was accomplished, when needed, by twisted fiber optic faceplates. Such tubes are not available in a number of sizes, some as small as 18 mm in diameter. The wafer tube of the invention has a phosphor screen anode, a photocathode, and a fiber optics input faceplate.

To drive the wafer tube, a power supply 19 is provided. Special power supplies are commercially available that are small enough to fit in nightsights for rifles and pocket sized hand held viewers. If desired, the wafer tube can share the power supply of whatever video signal source 20 is provided for the solid state display 14. Power for the tube is supplied by a simple high voltage cable 21 while the voltage for the solid state display rides piggy back on the coaxial cable 22 provided for the video signal. Solid state device 14 contains all electronics needed for separating the dc supply current from the video and for separating, amplifying and channeling synchronizing signals and pixel information of the video.

The maximum luminous output of the solid state display alone is 350–500 NITS. This is more than sufficient for most night vision applications, artificial lighting ambients and some daytime uses, but is insufficient for bright ambients such as are found in daytime avionics and similar situations. By using a wafer tube with a nominal gain of 10 to 20 the maximum luminance may be controlled over a range from 0.35 NITS to 35,000 NITS. This will suffice for a dark-adapted observer in complete darkness or an observer adapted to daylight in brilliant diffused or scattered light occasionally by brightly lit clouds or other particulate banks such as smoke. In addition to amplification or attenuation, there is also an accompanying change in spectral response which reduces eye fatigue or permits the use of a narrow spectral band to match certain types of holographic devices.

FIG. 2 shows a simple application of the present display system in a head mounted configuration. The display system of FIG. 1 is mounted on the helmet 33 of an observer by means of a bracket 34, e.g. a bracket such as is shown in patent application Ser. No. 097,616 now abandoned, for a "Helmet Support for Electro-Optical Monoculars" by William S. Flogaus, et al, filed Nov. 27, 1979; in the center of his forehead just above his field of vision. A see-through combiner 32 is also mounted on the helmet in the field of view. An optical element 31, e.g. a fiber otpic faceplate presents the TV image to the see-through combiner. The TV image may for example be a far-infrared image that has been converted to a visible image by a thermal viewer. The observer could then view this image superimposed on the normally visible image of the same scene. Alternatively the TV image could be generated by computers from memory or radar data and the like.

FIG. 3 shows a more advanced multimode viewer according to the present invention. The user wears plastic faceplate 40, held in place by adjustable retaining gear 41 which surrounds the head and cups under the chin. To permit direct viewing of an object or scene and simultaneous viewing of an intensified image and/or a TV image a pair of see-through optical elements 42 are mounted at eye level inside the faceplate. The top of the faceplate defines a raised housing 40A with a vertical front wall and a horizontal top wall. An independent image intensifier system 43 is mounted through the vertical wall and the display system 44 of FIG. 1 is mounted through the top wall. Male sockets (not shown) are mounted through one or more remaining walls of this same housing and electrically connected to the intensifiers and solid state display in the usual manner well known in the art. These connectors can then be connected to a vehicle power supply or a portable battery power supply and a video signal source by means of electrical umbilical cord as was indicated in FIG. 1.

FIG. 4 shows the manner in which images from various parts of the viewer are combined. The horizontal image from the wafer tube of the solid state display system 44 is formed above the eye level of the user and is projected via suitable otpics 55 down through a first see-through reflecting element 51 so that it is reflected by a second see-through reflecting element 52 then to a third reflector 53 and finally to see-through reflectors 42 which reflect each image into a different eye of the user. The independent image intensifier system 43 forms a vertical image also above eye level between reflectors 51 and 52 which is projected by the optics within the image intensifying system toward the user reflecting off the back of reflector 51 and otherwise following the same path as the image from the display system 44. Finally the observer can see through the otpical elements 42 to view the object or scene on which the independent image 43 is focussed, the reflectors 52 and 53 being out of this field of view. The optical element 42 for reflecting purposes may be a holographic, toric, aspherical or spherical optic element. Any of these permit the three resulting images to be viewed simultaneously at the same apparent range by the user. Holographic optical elements are usually designed to operate over a very narrow bandwidth and the use of a wafer tube in the display system permits the use of a phosphor that matches that bandwidth in both projected image systems.

The video signal source 20 in FIG. 1 may be from a sophisticated radar, a far infrared imaging system, a closed circuit TV system or simply a normal TV receiving circuit and antenna tuned to a remote transmitter. The various images involved in the FIGS. 3 and 4 device need not all be related to one another. The solid state display image, for example, may be vectoral or alphanumeric in nature. Many other modifications of the disclosed devices will be immediately obvious to those skilled in the art, but the invention is limited only by the claims which follow.

I claim:

1. A display system in combination with a helmet comprising:
   a thin flat solid state display element having an array of thin-film electroluminescent elements for radiating a T.V. image;
   an image intensifying tube having a screen anode, a photocathode and a fiber optics input faceplate;

housing means supporting said display element and said tube with said photocathode coupled to the output of said thin, flat, solid state display element through the fiber optics input faceplate;

a helmet adapted for mounting said display system;

said housing means mounted on said helmet; and a visor so mounted on said helmet such that it reflects an image radiating from said tube, whereby the wearer of said helmet may see the reflected image when looking through said visor.

2. The apparatus of claim 1 wherein:

said housing means includes a facemask adapted to cover the eyes of a user;

said solid state display element is mounted horizontally on said facemask above the field of view of the user radiating its TV image downward; and wherein there is provided a reflecting means including at least one see-through reflector located in the field of view of the user and mounted on said facemask to direct said TV image on said display to an eye of the user.

3. The apparatus of claim 2 wherein:

said user views a given scene normally through said at least one see-through reflector;

an independent image intensifier is mounted on said facemask above the eyelevel of the user, is focussed on said given scene, and forms a light image thereof;

said reflecting means further includes a second see-through reflector through which said TV image passes unreflected, said second see-through reflector reflecting said light image into superposition with said TV image onto a reflector and into an eye of the user.

* * * * *